United States Patent
Lu et al.

(10) Patent No.: US 12,298,435 B2
(45) Date of Patent: May 13, 2025

(54) INTEGRATED TRANSMITTER AND RECEIVER MODULE FOR LiDAR SYSTEM

(71) Applicant: BEIJING VOYAGER TECHNOLOGY CO., LTD., Beijing (CN)

(72) Inventors: Yue Lu, Mountain View, CA (US); Youmin Wang, Mountain View, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 695 days.

(21) Appl. No.: 17/115,785

(22) Filed: Dec. 8, 2020

(65) Prior Publication Data
US 2022/0179050 A1   Jun. 9, 2022

(51) Int. Cl.
*G01S 7/481* (2006.01)
*G01S 17/89* (2020.01)

(52) U.S. Cl.
CPC .......... *G01S 7/4811* (2013.01); *G01S 7/4814* (2013.01); *G01S 7/4816* (2013.01); *G01S 7/4817* (2013.01); *G01S 17/89* (2013.01)

(58) Field of Classification Search
CPC .... G01S 7/4811; G01S 7/4814; G01S 7/4816; G01S 7/4817; G01S 17/89; G01S 7/4813
See application file for complete search history.

(56) References Cited

U.S. PATENT DOCUMENTS

| | | | | |
|---|---|---|---|---|
| 5,808,727 | A * | 9/1998 | Katayama | G01S 7/4811 356/4.01 |
| 11,223,756 | B1 * | 1/2022 | Sharma | H04N 23/55 |
| 2003/0151121 | A1 * | 8/2003 | Kuhara | G02B 6/421 257/666 |
| 2015/0378012 | A1 * | 12/2015 | Sayyah | H01S 5/021 438/25 |
| 2016/0356890 | A1 * | 12/2016 | Fried | G01S 7/4863 |
| 2020/0018835 | A1 * | 1/2020 | Pei | G01S 17/10 |
| 2020/0088859 | A1 * | 3/2020 | Shepard | G01S 17/42 |
| 2021/0255293 | A1 * | 8/2021 | Kryvobok | G01S 17/58 |

* cited by examiner

*Primary Examiner* — Isam A Alsomiri
*Assistant Examiner* — Sanjida Naser
(74) *Attorney, Agent, or Firm* — BAYES PLLC

(57) ABSTRACT

Embodiments of the disclosure provide optical sensing systems, optical sensing methods, and integrated transmitter/receiver (TX/RX) modules. An exemplary optical sensing system includes an integrated TX/RX module and a controller coupled to the integrated TX/RX module. The integrated TX/RX module includes a laser emitter, one or more optics, and a receiver frontend. The laser emitter is configured to emit an optical signal toward the one or more optics. The one or more optics are configured to form the optical signal received from the laser emitter into a predefined shape and direct the optical signal having the predefined shape to an environment surrounding the optical sensing system. The receiver frontend is configured to receive a returned optical signal from the environment and convert the returned optical signal into an electrical signal. The laser emitter, the one or more optics, and the receiver frontend are assembled in a single package.

19 Claims, 7 Drawing Sheets

600

| EMIT, BY A LASER EMITTER, AN OPTICAL SIGNAL TOWARD ONE OR MORE OPTICS OF AN INTEGRATED TX/RX MODULE | S602 |

↓

| FORM, BY THE ONE OR MORE OPTICS, THE OPTICAL SIGNAL INTO A PREDEFINED SHAPE AND DIRECT THE OPTICAL SIGNAL HAVING THE PREDEFINED SHAPE TO AN ENVIRONMENT | S604 |

↓

| RECEIVE, BY A RECEIVER FRONTEND ASSEMBLED IN A SINGLE PACKAGE WITH THE LASER EMITTER AND THE ONE OR MORE OPTICS, A RETURNED OPTICAL SIGNAL FROM THE ENVIRONMENT AND CONVERT THE RETURNED OPTICAL SIGNAL INTO AN ELECTRICAL SIGNAL | S606 |

FIG. 6

INTEGRATED TRANSMITTER AND RECEIVER MODULE FOR LiDAR SYSTEM

TECHNICAL FIELD

The present disclosure relates to a light detection and ranging (LiDAR) system, and more particularly to, integrating transmitter and receiver of a LiDAR system in a single package.

BACKGROUND

In a typical coaxial LiDAR system, a laser signal (pulsed or continuous wave) is delivered through transmitting optics. After hitting an object in the environment, the laser signal is bounced back (becoming a reflected laser signal) and re-directed onto a detection arm, typically via a beam splitter. Next, the reflected laser signal is collected by a photodetector of the detection arm. During practical implementations, a few issues arise to impede this architecture from quick assembly and reliable manufacturing. The first issue is the difficulty to miniaturize the overall size of the LiDAR system. This is mainly due to that all components in current LiDAR systems are sitting separately in position, and many of these components (e.g., laser source, detector, scanner) require individual packaging themselves. The second issue is the difficulty to align them accurately. Considering that the sizes of the laser source and the photodetector are often on the order of a few tens of micrometers to a few hundreds of micrometers, it is very challenging to achieve, at the system level, high accuracy mechanical alignment that is crucial to overall performance.

Embodiments of the disclosure address the above problems by integrating transmitter and receiver of a LiDAR system in a single package.

SUMMARY

In one example, embodiments of the disclosure include an optical sensing system. The optical sensing system may include an integrated transmitter/receiver (TX/RX) module and a controller coupled to the integrated TX/RX module. The integrated TX/RX module may include a laser emitter, one or more optics, and a receiver frontend. The laser emitter may be configured to emit an optical signal toward the one or more optics. The one or more optics may be configured to form the optical signal received from the laser emitter into a predefined shape and direct the optical signal having the predefined shape to an environment surrounding the optical sensing system. The receiver frontend may be configured to receive a returned optical signal from the environment and convert the returned optical signal into an electrical signal. The laser emitter, the one or more optics, and the receiver frontend may be assembled in a single package. The controller may be configured to control the integrated TX/RX module to perform a sensing operation.

In another example, embodiments of the disclosure include an optical sensing method performed by an integrated TX/RX module of an optical sensing system. The method may include emitting, by a laser emitter of the integrated TX/RX module, an optical signal toward one or more optics of the integrated TX/RX module. The method may also include forming, by the one or more optics, the optical signal received from the laser emitter into a predefined shape, and directing, by the one or more optics, the optical signal having the predefined shape to an environment surrounding the optical sensing system. The method may further include receiving, by a receiver frontend of the integrated TX/RX module, a returned optical signal from the environment, and converting, by the receiver frontend, the returned optical signal into an electrical signal. The laser emitter, the one or more optics, and the receiver frontend may be assembled in a single package.

In a further example, embodiments of the disclosure include an integrated TX/RX module for an optical sensing system. The integrated TX/RX module may include a laser emitter, one or more optics, and a receiver frontend. The laser emitter may be configured to emit an optical signal toward the one or more optics. The one or more optics may be configured to form the optical signal received from the laser emitter into a predefined shape and direct the optical signal having the predefined shape to an environment surrounding the optical sensing system. The receiver frontend may be configured to receive a returned optical signal from the environment and convert the returned optical signal into an electrical signal. The laser emitter, the one or more optics, and the receiver frontend may be assembled in a single package.

It is to be understood that both the foregoing general description and the following detailed description are exemplary and explanatory only and are not restrictive of the invention, as claimed.

BRIEF DESCRIPTION OF THE DRAWINGS

FIG. 6 is a flow chart of an exemplary optical sensing method performed by an integrated transmitter and receiver module of a LiDAR system, according to embodiments of the disclosure.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Embodiments of the present disclosure provide integration of several LiDAR components in a single package that can be sealed or even hermetically sealed. The integrated LiDAR components may be disposed on a single printed circuit board (PCB). According to one example, a transmitter including a laser die and its peripheral circuitry (the transmitter is referred to as "TX" hereinafter) and a receiver including a detector die and its peripheral circuitry (the receiver is referred to as "RX" hereinafter) of a LiDAR system are integrated and copackaged inside a same package, e.g., a metal package similar to a butterfly package used in optical telecommunications. All of the TX and RX components including the related circuities may be disposed on a same PCB inside the same package. The integrated TX/RX components may then be hermetically sealed in the package.

The integrated TX/RX components inside a single package (referred to as an "integrated TX/RX module" hereinafter) offer many advantages compared to discrete components in existing LiDAR systems. First, the integrated TX/RX module eliminates the need for individually packaging each key sensitive device, such as the laser and detector dies. Second, light alignment accuracy within a single package may be improved due to the close distance among relevant components inside the same package. Third, for such a small package, thermal expansion, which usually causes system-level alignment drift, can be greatly reduced when a low-thermal-expansion material is introduced as the substrate, which can be used as the common substrate of multiple components. Fourth, due to the hermetical seal, environment changes such as humidity change that normally cause optics contamination can be prevented. The features and advantages described herein are exemplary and not all-inclusive.

The disclosed LiDAR system with an integrated TX/RX module can be used in many applications. For example, the disclosed LiDAR system can be used in advanced navigation technologies, such as to aid autonomous driving or to generate high-definition maps, in which the disclosed LiDAR system can be used as an optical sensing system equipped on a vehicle.

Figure 1:
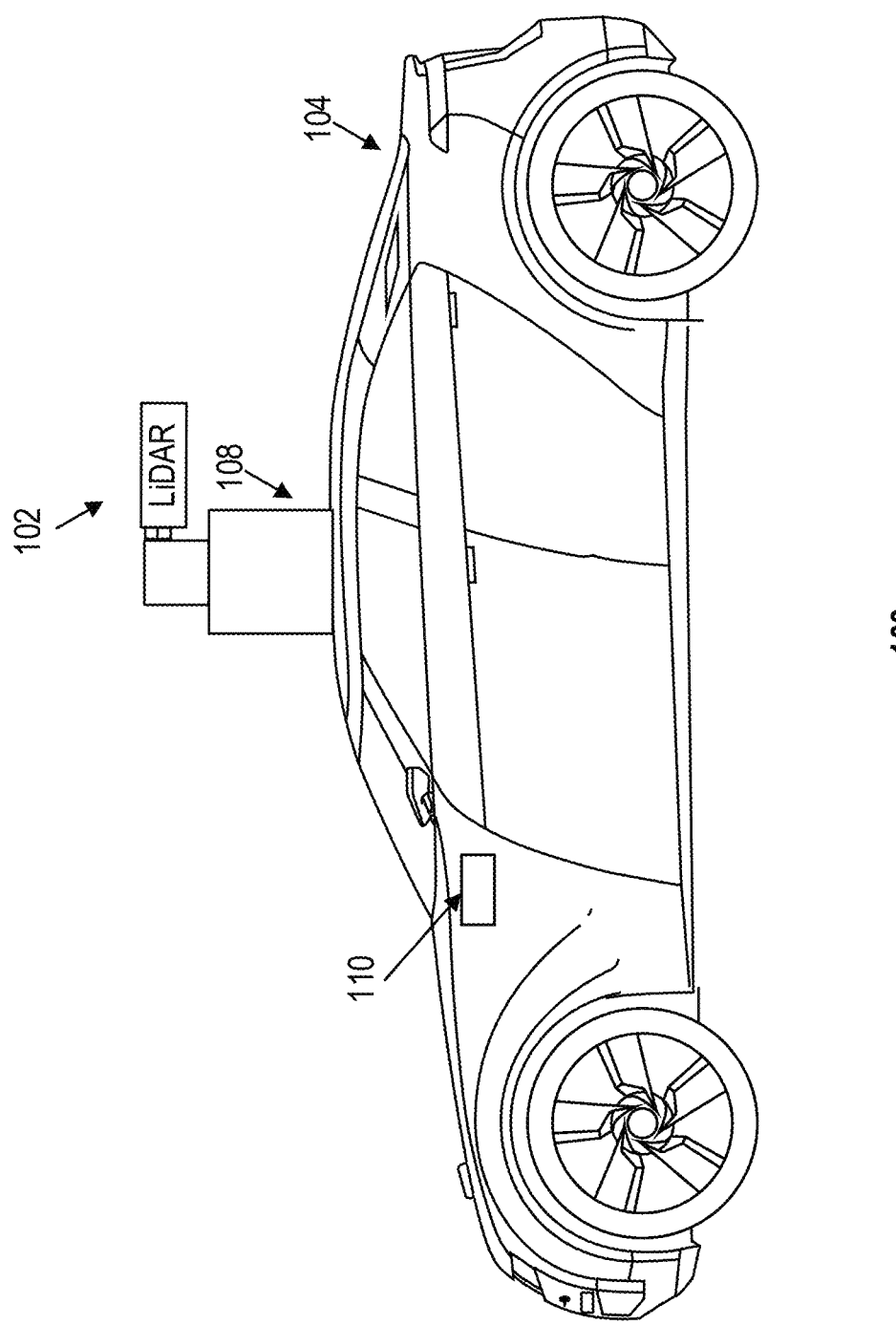
FIG. 1 illustrates a schematic diagram of an exemplary vehicle equipped with a LiDAR system containing an integrated transmitter and receiver module, according to embodiments of the disclosure.

FIG. 1 illustrates a schematic diagram of an exemplary vehicle equipped with an optical sensing system containing an integrated TX/RX module, according to embodiments of the disclosure. Consistent with some embodiments, vehicle 100 may be a survey vehicle configured for acquiring data for constructing a high-definition map or 3-D buildings and city modeling. Vehicle 100 may also be an autonomous driving vehicle.

As illustrated in FIG. 1, vehicle 100 may be equipped with an optical sensing system (e.g., a LiDAR system) 102 (also referred to as "LiDAR system 102" hereinafter) mounted to a body 104 via a mounting structure 108. Mounting structure 108 may be an electro-mechanical device installed or otherwise attached to body 104 of vehicle 100. In some embodiments of the present disclosure, mounting structure 108 may use screws, adhesives, or another mounting mechanism. Vehicle 100 may be additionally equipped with a sensor 110 inside or outside body 104 using any suitable mounting mechanisms. Sensor 110 may include sensors used in a navigation unit, such as a Global Positioning System (GPS) receiver and one or more Inertial Measurement Unit (IMU) sensors. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3D sensing performance.

Consistent with some embodiments, LiDAR system 102 and sensor 110 may be configured to capture data as vehicle 100 moves along a trajectory. For example, a transmitter of LiDAR system 102 may be configured to scan the surrounding environment. LiDAR system 102 measures distance to a target by illuminating the target with laser beams and measuring the reflected/scattered laser signals with a receiver. The laser beams used for LiDAR system 102 may be ultraviolet, visible, or near-infrared, and may be pulsed or continuous wave laser beams. In some embodiments of the present disclosure, LiDAR system 102 may capture point clouds including depth information of the objects in the surrounding environment, which may be used for constructing a high-definition map or 3-D buildings and city modeling. As vehicle 100 moves along the trajectory, LiDAR system 102 may continuously capture data including the depth information of the surrounding objects (such as moving vehicles, buildings, road signs, pedestrians, etc.) for map, building, or city modeling construction.

Figure 2:
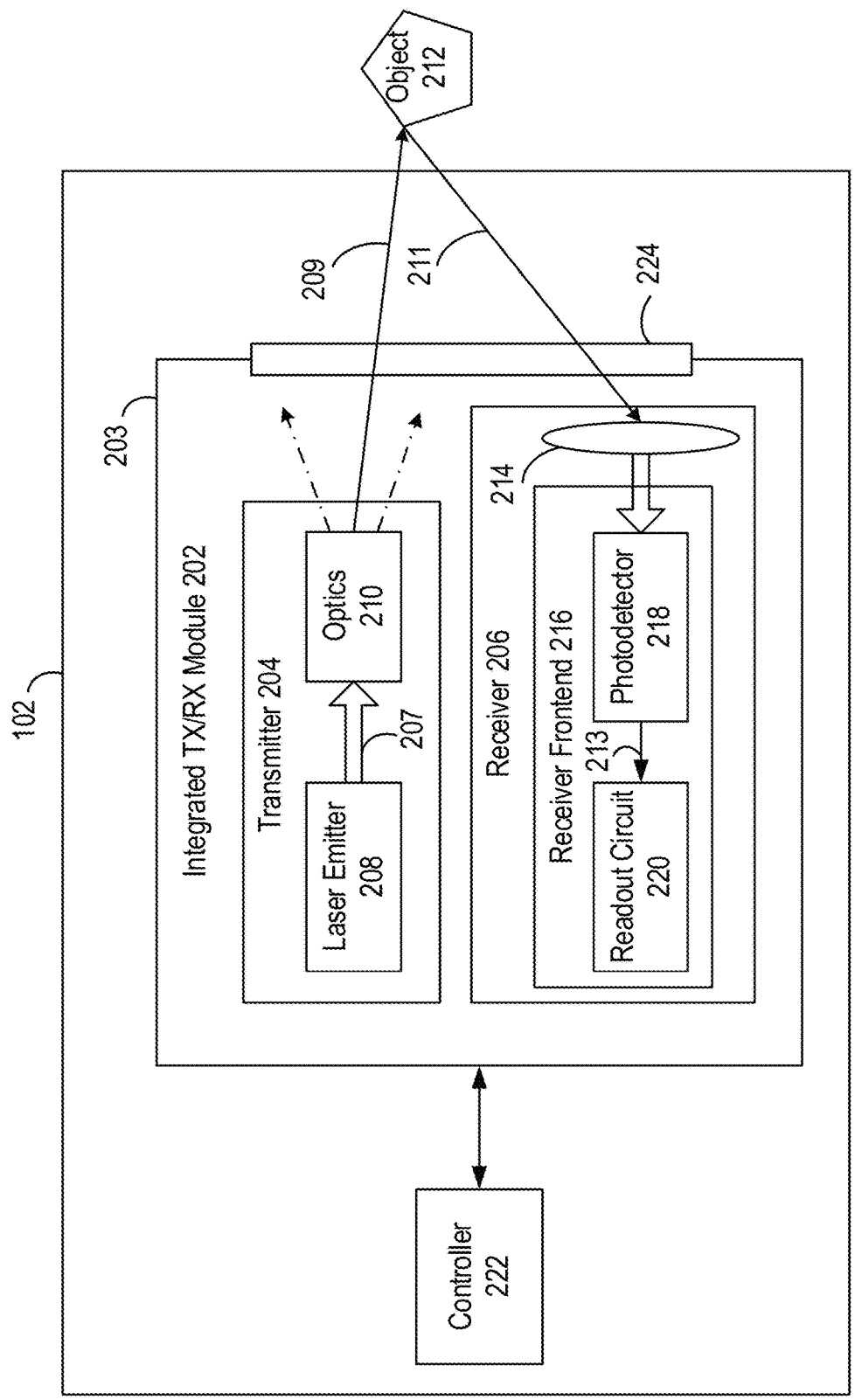
FIG. 2 illustrates a block diagram of an exemplary LiDAR system containing an integrated transmitter and receiver module, according to embodiments of the disclosure.

FIG. 2 illustrates a block diagram of an exemplary LiDAR system containing an integrated TX/RX module, according to embodiments of the disclosure. As illustrated, LiDAR system 102 may include an integrated TX/RX module 202 and a controller 222 coupled to integrated TX/RX module 202. Integrated TX/RX module 202 may include TX and RX components integrated into a single package. For instance, integrated TX/RX module 202 may include transmitter 204 and receiver 206 integrated into a single hermetically sealed package 203.

In some embodiments, each of transmitter 204 and receiver 206 may further include its specific components, as illustrated in FIG. 2. For instance, transmitter 204 may further include laser emitter 208 for emitting an optical signal and optics 210 for shaping an emitted optical signal. In another example, receiver 206 may include receiving lens 214 and receiver frontend 216, which may further include photodetector 218 for detecting a returned optical signal from the environment and readout circuit 220 for converting the detected signal to an electrical signal for further processing (e.g., by controller 222 of LiDAR system 102).

Transmitter 204 may emit optical beams (e.g., pulsed laser beams, continuous wave (CW) beams, frequency modulated continuous wave (FMCW) beams, etc.) along multiple directions. Transmitter 204 may include one or more laser sources (e.g., a laser emitter 208) and one or more optics 210. According to one example, transmitter 204 may sequentially emit a stream of laser beams in different directions within a scan filed-of-view (FOV) (e.g., a range in angular degrees), as illustrated by dotted-dashed lines in FIG. 2.

Laser emitter 208 may be configured to provide laser beams 207 (also referred to as "native laser beams") to optics 210. For instance, laser emitter 208 may generate laser beams in the ultraviolet, visible, or near-infrared wavelength range, and provide the generated laser beams to optics 210. In some embodiments of the present disclosure, laser emitter 208 may include a pulsed laser diode (PLD), a CW laser diode, a vertical-cavity surface-emitting laser (VCSEL), a fiber laser, etc. A pulsed or CW laser diode may be a semiconductor device similar to a light-emitting diode (LED) in which the laser beam is created at the diode's junction. Depending on the semiconductor materials of diodes in laser emitter 208, the wavelength of incident laser beams 207 may be at different values, such as 405 nm, between 445 nm and 465 nm, between 510 nm and 525 nm, 532 nm, 635 nm, between 650 nm and 660 nm, 670 nm, 760 nm, 785 nm, 808 nm, 848 nm, 870 nm, 905 nm, 940 nm, 980 nm, 1064 nm, 1083 nm, 1310 nm, 1370 nm, 1550 nm, 1625 nm, 1650 nm, 1940 nm, 2000 nm, etc. It is understood that any suitable laser emitter may be used as laser emitter 208 for emitting laser beams 207 at a proper wavelength.

Optics 210 may include optical components (e.g., lenses, mirrors) that can shape the laser light (e.g., laser beams 207), e.g., collimate the laser light into a narrow laser beam 209, to increase scan resolution and/or scan range. In some embodiments, transmitter 204 may also include a scanner (not shown) configured to emit laser beams 209 to an object 212 in a range of detection angles (collectively forming the FOV of transmitter 204). In some embodiments, object 212 may be made of a wide range of materials including, for example, non-metallic objects, rocks, rain, chemical compounds, aerosols, clouds, and even single molecules. The wavelength of laser beams 209 may vary based on the composition of object 212. In some embodiments, at each time point during the scan, the scanner may emit laser beams 209 to object 212 in a direction within a range of scanning angles by rotating a deflector, such as a micromachined mirror assembly.

In some embodiments, for laser beams to be emitted from optics 210 inside the hermetically sealed package 203 to object 212 outside the package, the hermetically sealed package 203 of integrated TX/RX module 202 may include a glass window 224 for light emission. That is, emitted laser beams 209 may pass through glass window 224 of the hermetically sealed package 203, to reach object 212 in the surrounding of LiDAR system 102.

Receiver 206 may be configured to detect returned laser beams 211 returned from object 212. Upon contact, laser light can be reflected/scattered by object 212 via backscattering, such as Rayleigh scattering, Mie scattering, Raman scattering, and fluorescence. Returned laser beams 211 may be in a same or different direction from laser beams 209. In some embodiments, when returned laser beams 211 are in a different direction from laser beams 209, an optical filter may be used in lieu of glass in glass window 224, to help filter out any ambient light that is different than the laser wavelength. This helps reduce noise and thus improves the performance of LiDAR system 102. In some embodiments, after receiving laser beams returned from object 212, receiver 206 may process the received laser beams and output electrical signals reflecting the intensity of returned laser beams 211.

As illustrated in FIG. 2, receiver 206 may include a lens 214 and a receiver frontend 216, which further includes a photodetector 218 and a readout circuit 220, all of which are located inside the hermetically sealed package 203. Lens 214 may be configured to collect light from a respective direction in a receiver FOV and converge the returned laser beams 211 to focus on photodetector 218. At each time point during the scan, returned laser beams 211 may be collected by lens 214. Returned laser beams 211 may be returned from object 212. The pulses in returned laser beam 211 may have the same waveform (e.g., bandwidth and wavelength) as those in laser beams 209.

Photodetector 218 may be configured to detect returned laser beams 211 returned from object 212 and converged by lens 214. In some embodiments, photodetector 218 may convert the laser light (e.g., returned laser beams 211) converged by lens 214 into an electrical signal 213 (e.g., a current or a voltage signal). Electrical signal 213 may be an analog signal which is generated when photons are absorbed in a photodiode included in photodetector 218. In some embodiments, photodetector 218 may include a PIN detector, an avalanche photodiode (APD) detector, a single photon avalanche diode (SPAD) detector, a silicon photo multiplier (SiPM) detector, or the like.

Readout circuit 220 may be configured to integrate, amplify, filter, and/or multiplex signal detected by photodetector 218 and transfer the integrated, amplified, filtered, and/or multiplexed signal onto output parts (e.g., controller 222) for further processing. In some embodiments, readout circuit 220 may act as an interface between photodetector 218 and signal processing unit (e.g., controller 222). Depending on the configurations, readout circuit 220 may include one or more of a transimpedance amplifier (TIA), an analog-to-digital converter (ADC), a time-to-digital converter (TDC), and the like.

Controller 222 may be configured to control transmitter 204 and/or receiver 206 to perform detection/sensing operations. For instance, controller 222 may control laser emitter 208 to emit laser beams 207, or control optics 210 to shape laser beams 207 into laser beams 209. In some embodiments, controller 222 may also be implemented to perform data acquisition and analysis functions. For instance, controller 202 may collect digitalized signal information from readout circuit 220, determine the distance of object 212 from LiDAR system 102 according to the travel time of laser beams, and construct a high-definition map or 3-D buildings and city modeling surrounding LiDAR system 102 based on the distance information of object(s) 212.

As illustrated in FIG. 2, controller 222 may be located outside the hermetically sealed package 203 of integrated TX/RX module 202. Accordingly, controller 222 may communicate with TX/RX components of integrated TX/RX module 202 through connection pins, as further described in FIGS. 3A-5. In some embodiments, partial or full functions of controller 222 may be distributed to a similar component (e.g., a microcontroller) located inside the sealed package 203 of integrated TX/RX module 202, or the whole controller 222 itself may become part of the sealed package of integrated TX/RX module 202. Specific details regarding integrated TX/RX module 202, including its communication with controller 222 of LiDAR system 102, are provided hereinafter with reference to FIGS. 3A-6.

Figure 3A:
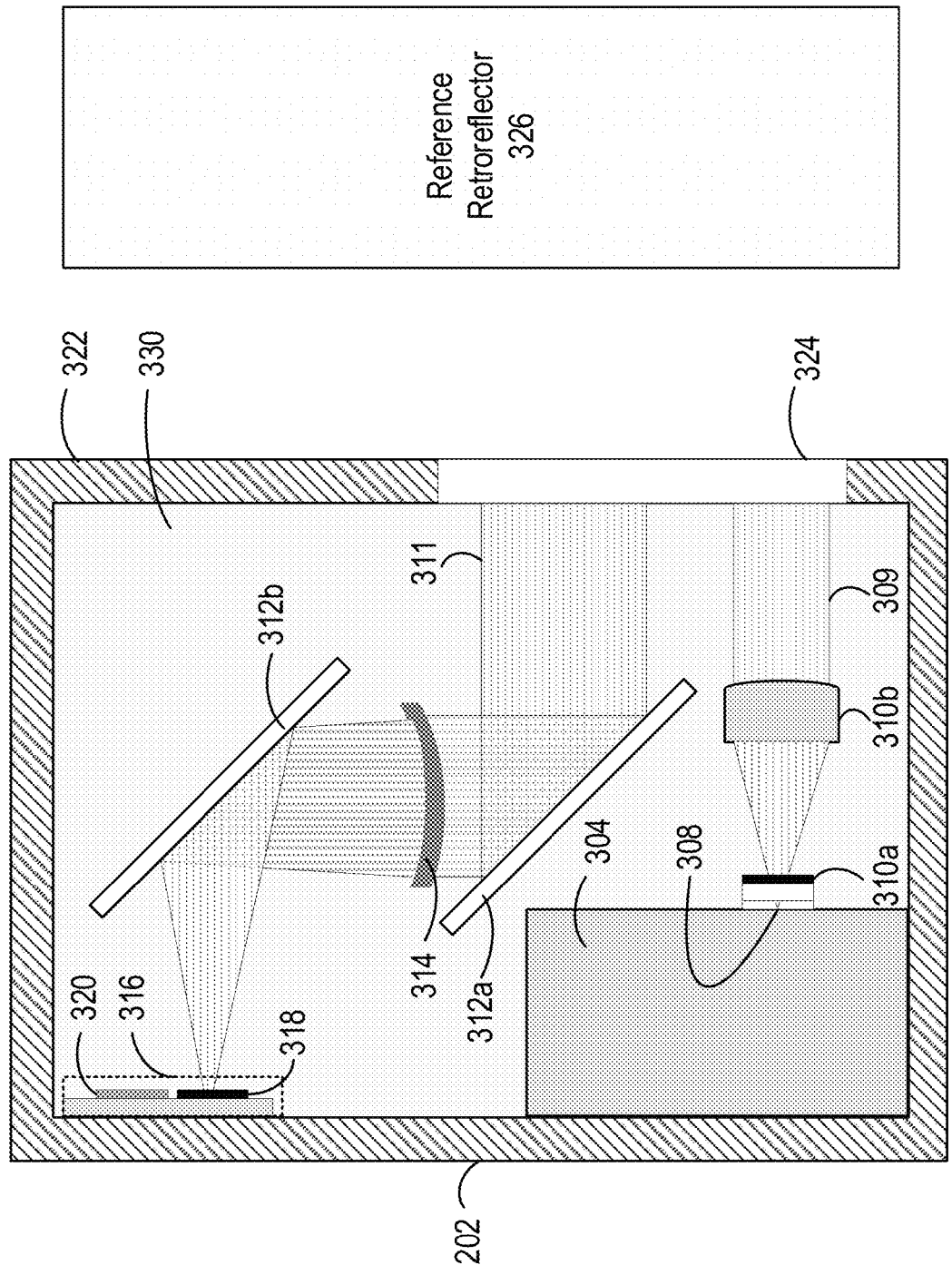
FIGS. 3A-3B each illustrate a plan view schematic diagram of an exemplary integrated transmitter and receiver module in a LiDAR system, according to embodiments of the disclosure.

FIG. 3A illustrates a schematic diagram of an exemplary integrated TX/RX module 202 in a LiDAR system, according to embodiments of the disclosure. As illustrated in FIG. 3A, integrated TX/RX module 202 may include a laser module 308, corresponding driving circuitry such as one or more integrated circuits (ICs) 304, optics 310a and 310b, and a receiver frontend 316 (indicated by box with dashed line in the figure), which further contains a photodetector 318 and a readout circuit 320. As illustrated, all of the components 304, 308, 310a, 310b, 318, and 320 are sealed in a single chamber/package 322. In some embodiments, integrated TX/RX module 202 in the sealed package 322 may further include one or more internal reflectors (e.g., 312a, 312b) that direct the returned laser beams, and receiving lens 314 that focuses the retuned laser beams onto the surface of photosensors located inside photodetector 318. The example illustrated in FIG. 3A shows that integrated TX/RX module 202 includes two internal reflectors 312a and 312b and one receiving lens 314. Other configurations (e.g., the number of the internal reflectors, the number of the receiving lens(es), position and location of each reflector/receiving lens, etc.) may also be used.

In some embodiments, integrated TX/RX module 202 may further include a substrate 330 that holds different components together in the sealed package 322. That is, each of the aforementioned components (e.g., 304, 308, 310a, 310b, 312a, 312b, 314, 318, and 320) in the sealed package 322 are fixed to substrate 330. Accordingly, after the sealing, these components (e.g., 304, 308, 310a, 310b, 312a, 312b, 314, 318, and 320) may be secured in their positions and orientations, to perform sensing functions, without the need to undergo further alignment through human intervention.

In some embodiments, the components (e.g., 304, 308, 310a, 310b, 312a, 312b, 314, 318, and 320) in the sealed package 322 may be fixed to substrate 330 through different mechanisms. For instance, driving IC(s) 304, laser module 308, optics 310a and 310b, and receiver frontend 316 may be permanently fixed to substrate 330 before alignment (e.g., before tuning reflectors/receiving lens to focus the returned laser beams onto photosensors of photodetector 318). Different fixing mechanisms for permanent fixing may be applied. For instance, mechanisms allowing stronger fixing may be used to fix components that require little or no alignment, such as 304, 308, 310a, 310b, and 316. On the other hand, reflector(s) 312a, 312b, and/or receiving lens 314 may not be fixed until after alignment is completed. Accordingly, to prevent alignment drifting (e.g., the position and/or orientation of aligned components change after the alignment), quick and efficient fixing mechanisms (e.g., fluid dispensing) may be applied, so that components such as 312a, 312b, and 314 can be fixed in a short period of time after the alignment.

In some embodiments, to properly align the retuned laser beams 311 with receiver frontend 316, an external reference retroflector 326 may be used. When laser beams 309 are emitted outside chamber 322 from a glass window 324, reference retroreflector 326 may reflect laser beams back to chamber 322 through glass window 324. The reflected laser beams may then allow the alignment to be performed. For instance, in an automatic alignment process, mechanical arms specifically designed for integrated TX/RX module manufacturing may extend to the unsealed chamber 322 to tune reflectors 312a/312b and/or receiving lens 314, including their orientation angles and/or positions, so as to focus the returned laser beams to photosensors of receiver frontend 316. After alignment, reflectors 312a/312b and receiving lens 314 may be fixed to the aligned positions and orientations right away, and the whole chamber 322 may be hermetically sealed afterward to form a sealed package.

In some embodiments, to prevent alignment from drifting due to environmental change after the fixing, certain low-thermal-expansion materials may be used for the construction of package substrate 330. These low-thermal expansion materials may include certain fine ceramics, such as silicon nitride, aluminum nitride, aluminum oxide, silicon carbide, etc. The low-thermal expansion materials may display little dimension change with changes in temperature, and thus, if used in substrate 330, may greatly reduce system-level alignment drift caused by thermal expansion. In some embodiments, other types of materials/structures may also be used in constructing substrate 330.

Figure 3B:
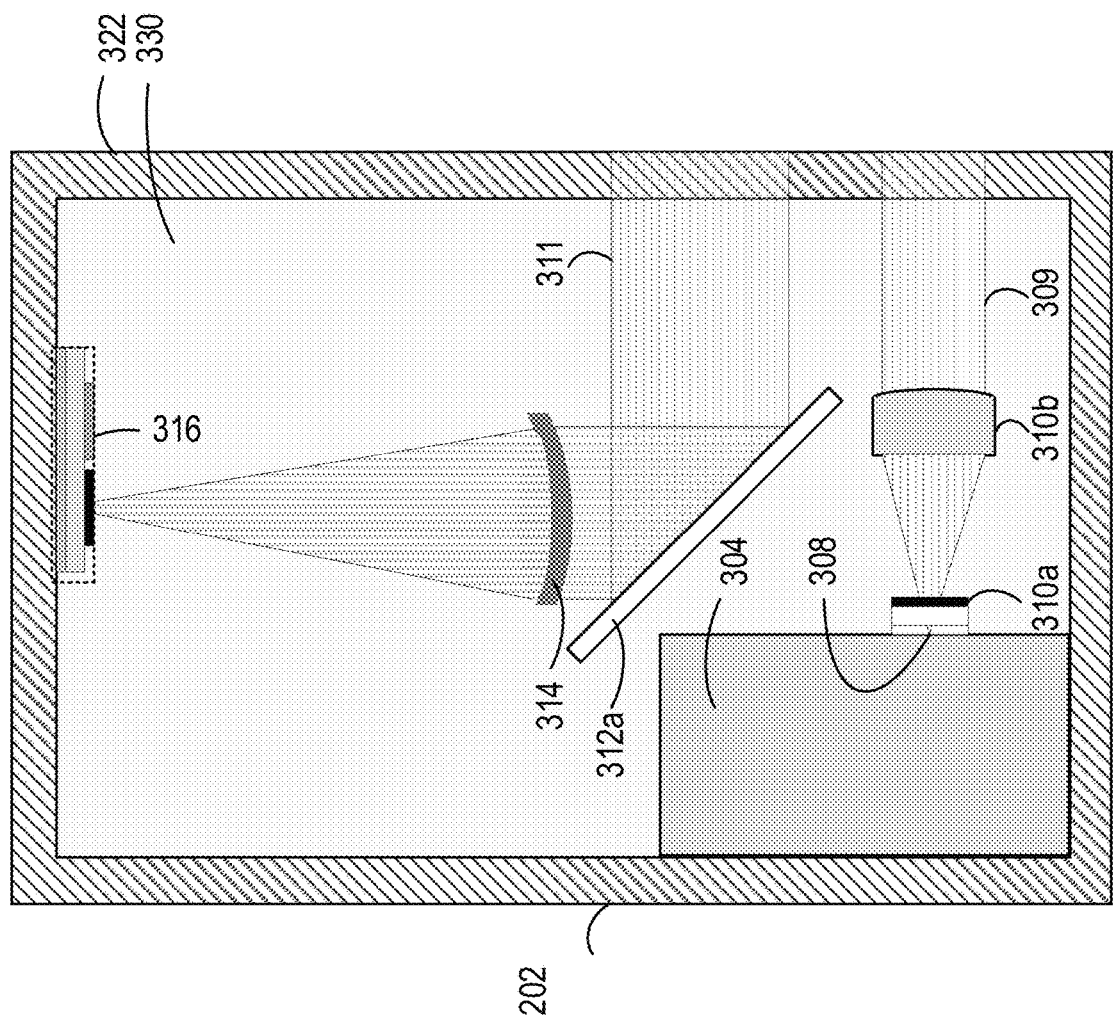

It is understood that FIG. 3A merely provides one exemplary layout for organizing TX/RX components in integrated TX/RX module 202. Other approaches to the layout of integrated TX/RX components may also be adopted. For instance, according to one embodiment, only one reflector 312a may be used in integrated TX/RX module 202, as illustrated in FIG. 3B. To allow proper detection of returned laser beams 311, receiver frontend 316 may need to be disposed to a different side of the package compared to FIG. 3A. Other layouts of TX/RX components different from those shown in FIGS. 3A-3B may also be used.

It is also understood that, while only one laser module 308, one set of optics (310a, 310b), and one receiver frontend 316 are illustrated in FIGS. 3A-3B, the present disclosure is not limited to such configuration in the sealed package 322. In some embodiments, a plurality of laser modules, a plurality of sets of corresponding optics, and/or a plurality of corresponding receiver frontends may be used in the sealed package 322. The plurality of laser modules may be disposed in a three-dimensional (3D) layout in the sealed package 322. For instance, the plurality of laser modules may be stacked in a staircase format with respect to substrate 330. Correspondingly, the plurality of sets of optics and the plurality of receiver frontends may also be stacked in a staircase format. In some embodiments, the plurality of laser modules, the plurality of sets of corresponding optics, and the plurality of corresponding receiver frontends may be disposed in the sealed package 322 in a way other than a staircase format, as long as the organization of these components allows automatic alignment to be performed through mechanical arms or through other proper approaches, so that mass production of integrated TX/RX modules becomes feasible.

Figure 4:
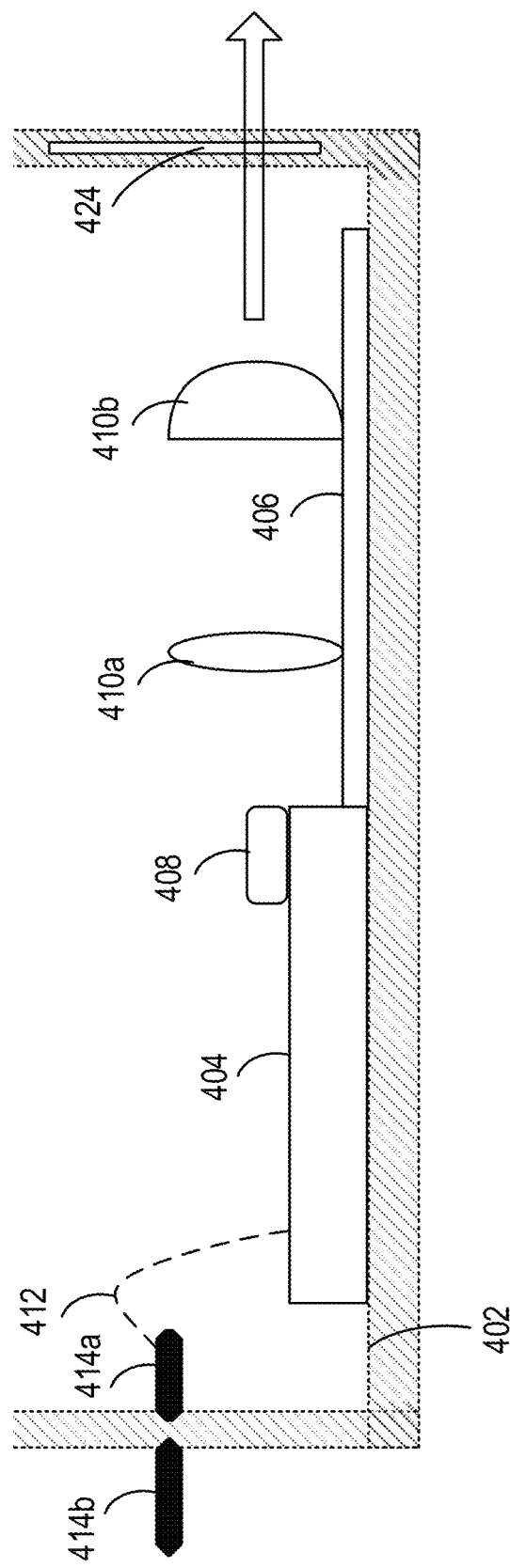
FIG. 4 illustrates a side view schematic diagram of an exemplary integrated transmitter module, according to embodiments of the disclosure.
Figure 5:
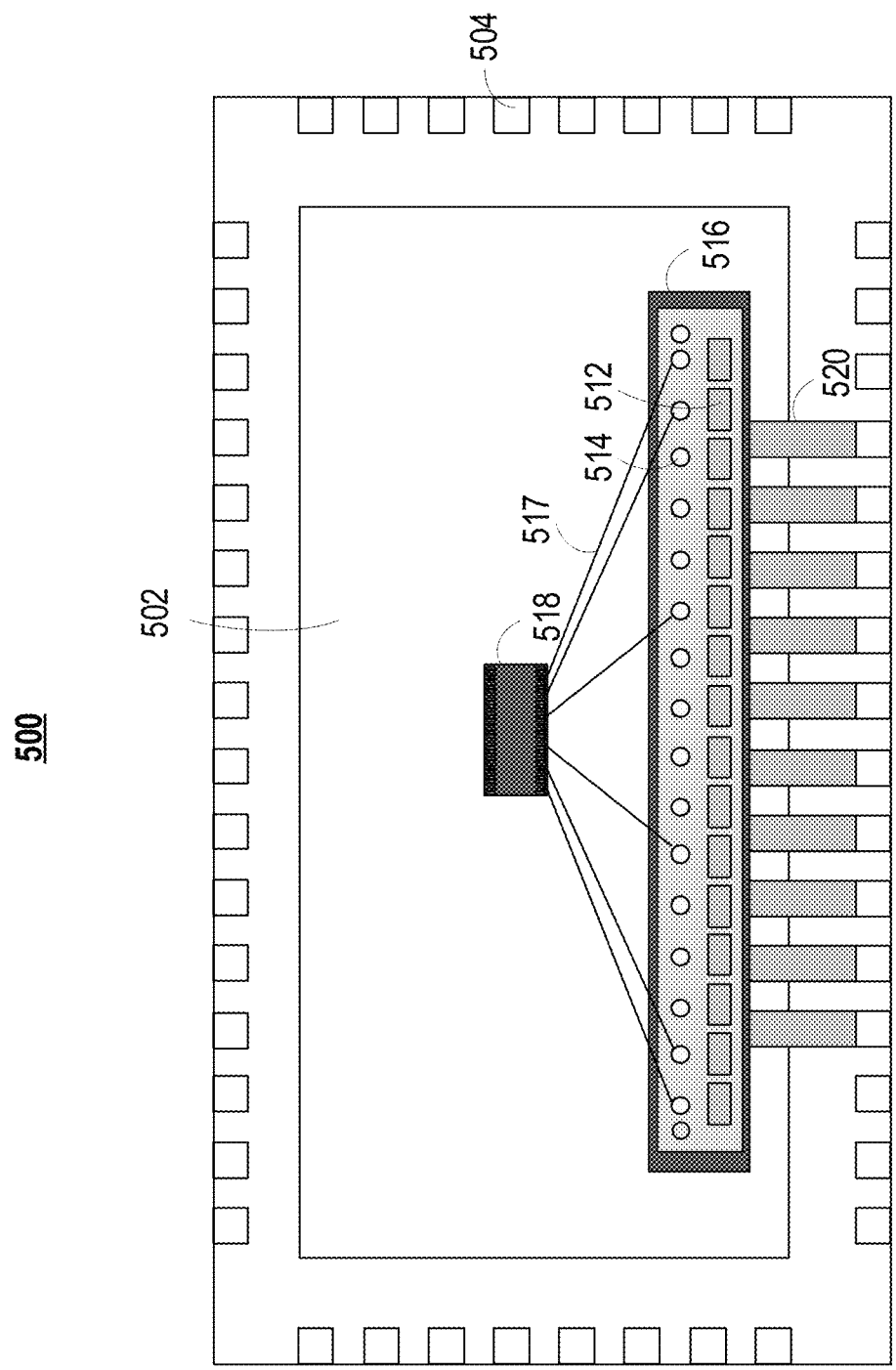
FIG. 5 illustrates a plan view schematic diagram of an exemplary receiver frontend, according to embodiments of the disclosure.

In some embodiments, to facilitate quick assembly and reliable manufacturing of integrated TX/RX module 202 in mass production, certain TX components and RX components may be respectively pre-assembled and/or pre-aligned before being disposed into integrated TX/RX module 202. That is, instead of fixing individual components (e.g., 304, 308, 310a, 310b, 312a/312b, 314, 318, and 320) onto substrate 330, a sub-set of these components may be pre-assembled and/or pre-aligned. The pre-assembled components may then be disposed onto substrate 330 as an assembled/aligned group instead of as individual components. FIGS. 4-5 each illustrate a respective assembly of TX components and RX components after pre-assembly.

FIG. 4 illustrates a schematic diagram of an exemplary integrated transmitter module 400, according to embodiments of the disclosure. As illustrated, pre-assembled transmitter components in integrated transmitter module 400 may include driving IC(s) 404, a laser module 408, and optics 410a and 410b (which may be implemented by a Fast Axis Collimator (FAC) and a Slow Axis Collimator (SAC), respectively), which are assembled together by fixing or attaching the components onto the same substrate 406. In some embodiments, driving IC(s) 404 and laser module 408 may be soldered onto the same PCB before being fixed or attached to substrate 406. To allow proper operation in laser emitting, alignment of optics 410a and 410b with laser module 408 may be performed before being fixed to substrate 406. That is, after fixing optics 410a and 410b, these components in integrated transmitter module 400 do not need further alignment, even after integrated transmitter module 400 is packaged into integrated TX/RX module 202.

In some embodiments, transmitter components such as driving IC(s) 404 may be connected to one or more pins 414a/414b for external communications, as illustrated in FIG. 4. For instance, driving IC(s) 404 may communicate with controller 222 of LiDAR system 102 for controlling laser beam emission. In some embodiments, these pins 414a/414b may not be part of integrated transmitter module 400, but rather be disposed on the package 402 of integrated TX/RX module 202. Accordingly, when integrated transmitter module 400 is disposed inside package 402 of integrated TX/RX module 202, driving IC(s) 404 may then connect to pin(s) 414a inside package 402 through one or more bonding wires 412. In some embodiments, besides these connection pins 414a/414b, package 402 may also include a glass window 424 for emitting laser beams to the environment surrounding LiDAR system 102.

FIG. 5 illustrates a schematic diagram of an exemplary receiver frontend 500, according to embodiments of the disclosure. The illustrated receiver frontend 500 may include a photodetector 516 and a readout circuit 518, which are copackaged in the same package through disposing on the same substrate 502. Photodetector 516 may connect to readout circuit 518 through one or more bonding wires 517 for signal transmission. As also illustrated in FIG. 5, photodetector 516 may include photosensors 512 for optical signal detection and bonding pads 514 for wire bonding to readout circuit 518. One or more bonding pads 520 may bond photodetector 516 to pins 504 on substrate 502. Although not illustrated, readout circuit 518 may also include a certain number of bonding pads for wire bonding to photodetector 516, as well as bonding pads for bonding to surrounding pins 504. In some embodiments, one or more pins 504 for external communications may be disposed on the package of integrated TX/RX module 202 instead, as previously described with respect to pins 414a/414b in FIG. 4. Accordingly, when receiver frontend 500 is integrated into integrated TX/RX module 202, one or more bonding wires in receiver frontend 500 may then wire bond to certain pins on the package wall of integrated TX/RX module 202, for external communication with other components (e.g., controller 222) of LiDAR system 102.

It is understood that the foregoing descriptions for integrated transmitter module 400 and receiver frontend 500 merely provide one example for pre-assembly of certain TX or RX components. Other approaches for pre-assembly of certain TX or RX components are also contemplated. For instance, photodetector 516 and readout circuit 518 may be integrated into a 2.5 dimensional (2.5D) or 3 dimensional (3D) structure without requiring bonding wires. In the 2.5D or 3D structure, instead of using bonding wires, certain Through Silicon Vias (TSVs), bumps, and/or an interposer may be used for establishing communication between a photodetector and a readout circuit.

After pre-assembly, integrated transmitter module 400 and receiver frontend 500 may be integrated onto substrate 330. Reflector(s) 312a/312b and/or receiving lens 314 may then be adjusted through automatic alignment. After alignment, reflector(s) 312a/312b and receiving lens 314 may be quickly fixed to substrate 330, to form integrated TX/RX module 202, which is then hermetically sealed.

In some embodiments, hermetically sealing of integrated TX/RX module 202 may include formation of an airtight package that prevents passage of gases between the inside and outside of the package. In some embodiments, hermetically sealing of integrated TX/RX module 202 may include removal or exchange of air (e.g., with nitrogen) inside chamber 322 of integrated TX/RX module 202.

In some embodiments, after being sealed as a single package, integrated TX/RX module 202 may be further connected to other components (e.g., controller 222) of LiDAR system 102 through one or more pins, bonding wires, and the like that are located on the outside wall of package 322, to form a complete optical sensing system (e.g., LiDAR system 102) configured to perform optical sensing operations.

FIG. 6 is a flow chart of an exemplary optical sensing method performed by a LiDAR system containing an integrated TX/RX module, according to embodiments of the present disclosure. In some embodiments, method 600 may be performed by various components of LiDAR system 102, e.g., integrated TX/RX module 202 and/or controller 222. In some embodiments, method 600 may include steps S602-S606. It is to be appreciated that some of the steps may be optional. Further, some of the steps may be performed simultaneously, or in a different order than that shown in FIG. 6.

In step S602, a laser emitter of an optical sensing system (e.g., laser emitter 208 of integrated TX/RX module 202 of LiDAR system 102) may emit an optical signal toward one or more optics (e.g., optics 210 of integrated TX/RX module 202) of the optical sensing system. As previously described, the one or more optics and the laser emitter may be disposed on the same substrate inside a hermetically sealed package 322 of integrated TX/RX module 202. For instance, laser emitter 208 and optics 210 may be disposed on the same PCB board, which is then fixed onto the substrate of integrated TX/RX module 202 in the package. Alternatively, laser emitter 208 and optics 210 may be directly fixed onto the substrate of integrated TX/RX module 202 in the package. The one or more optics 210 may be aligned with laser emitter 208 before being hermetically sealed in the package.

In step S604, the one or more optics may form the optical signal received from the laser emitter into a predefined shape and direct the optical signal having the predefined shape to an environment surrounding the optical sensing system. The one or more optics may be configured by a controlling unit (e.g., controller 222) of the optical sensing system, to allow a certain shape to be formed for the optical signal received from the laser emitter. Accordingly, when the optical signal is received from the laser emitter, the one or more optics may form the optical signal into a predefined shape. The shaped optical signal is then directed to the environment outside the package of integrated TX/RX module 202, e.g., through glass window 224. The environment may include one or more objects, which may reflect the optical signal back to integrated TX/RX module 202 of LiDAR system 102.

In step S606, a receiver frontend of the optical sensing system may receive the returned optical signal from the environment and convert the returned optical signal into an electrical signal. As discussed above, after passing through the glass window (e.g., 324) of the sealed package (e.g., 322) of integrated TX/RX module 202, the returned optical signal may be reflected by one or more reflectors (e.g., 312a, 312b) that guide the returned optical signal to the photosensors of the receiver frontend. In the meantime, the returned optical signal may also pass through a receiving lens (e.g., 314), which converges and focuses the returned optical signal on the photosensors of the receiver frontend. The photosensors then sense the returned optical signal and convert the optical signal to an electrical signal reflecting the intensity of the optical signal. Depending on the configuration of the receiver frontend, the electrical signal may be a current or voltage signal. Through bonding wires or TSVs, the electrical signal may be transmitted to a readout circuit (e.g., readout circuit 220 of integrated TX/RX module 202) for further processing, e.g., converting the electrical signal to a digital signal. The digitalized signal may be forwarded to the controller (e.g., controller 222) of the optical sensing system for further processing. For instance, through one or more pins disposed on the outer surface of the sealed package of integrated TX/RX module 202, the digitalized signal may be transmitted from the sealed package to controller 222 of the optical sensing system for further processing, e.g., constructing a high-definition map or 3-D buildings and city modeling.

Although the disclosure is made using a LiDAR system as an example, the disclosed embodiments may be adapted and implemented to other types of optical sensing systems that use receivers to receive optical signals, not limited to laser beams. For example, the embodiments may be readily adapted for optical imaging systems or radar detection systems that use electromagnetic waves to scan objects.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It is intended that the specification and examples be considered as exemplary only, with a true scope being indicated by the following claims and their equivalents.

The invention claimed is:

1. An optical sensing system, comprising:
   an integrated transmitter/receiver (TX/RX) module, the integrated TX/RX module comprising:
      a laser emitter;
      one or more transmitting optics;
      one or more receiving reflectors; and
      a receiver frontend,
      wherein the laser emitter and the one or more transmitting optics are part of the TX in the TX/RX module, and the receiver frontend and the one or more receiving reflectors are part of the RX in the TX/RX module, and
      wherein:
         the laser emitter is configured to emit an optical signal toward the one or more optics;
         the one or more transmitting optics are configured to form the optical signal received from the laser emitter into a predefined shape and direct the optical signal having the predefined shape to an environment surrounding the optical sensing system;
         the one or more receiving reflectors are configured to direct a returned optical signal from the environment to the receiver frontend;
         the receiver frontend is configured to convert the returned optical signal into an electrical signal;
         the laser emitter, the one or more transmitting optics, the one or more receiving reflectors, and the receiver frontend are assembled in a single package; and
         the laser emitter, the one or more transmitting optics, and the receiver frontend are fixed to a substrate of the single package through permanent fixing, and the one or more receiving reflectors are fixed to the substrate through fluid dispensing different from the permanent fixing; and
   a controller coupled to the integrated TX/RX module, the controller being configured to control the integrated TX/RX module to perform a sensing operation.

2. The optical sensing system of claim 1, wherein the one or more receiving reflectors define a light path within the integrated TX/RX module for directing the returned optical signal to one or more photosensors of the receiver frontend.

3. The optical sensing system of claim 2, wherein the light path is defined by aligning the one or more receiving reflectors via an external reference retroreflector.

4. The optical sensing system of claim 2, wherein the integrated TX/RX module further comprises a receiving lens disposed in the light path of the returned optical signal, the receiving lens being assembled in the single package and being aligned to focus the returned optical signal on the one or more photosensors of the receiver frontend.

5. The optical sensing system of claim 1, wherein the receiver frontend comprises a photodetector and a readout circuit connected to each other through wire bonding.

6. The optical sensing system of claim 1, wherein the substrate comprises a printed circuit board (PCB).

7. The optical sensing system of claim 6, wherein the PCB is made of ceramic with a low-thermal-expansion.

8. The optical sensing system of claim 1, wherein the single package of the integrated TX/RX module is hermetically sealed.

9. The optical sensing system of claim 1, wherein the single package of the integrated TX/RX module comprises a plurality of laser emitters, a plurality set of transmitting optics, and a plurality of receiver frontends aligned in a three-dimensional array.

10. An optical sensing method performed by an integrated transmitter/receiver (TX/RX) module of an optical sensing system, the method comprising:
   emitting, by a laser emitter of the integrated TX/RX module, an optical signal toward one or more transmitting optics of the integrated TX/RX module;
   forming, by the one or more transmitting optics, the optical signal received from the laser emitter into a predefined shape, and directing, by the one or more transmitting optics, the optical signal having the predefined shape to an environment surrounding the optical sensing system;
   directing, by one or more receiving reflectors of the integrated TX/RX module, a returned optical signal from the environment to a receiver frontend of the integrated TX/RX module; and
   converting, by the receiver frontend, the returned optical signal into an electrical signal,
   wherein the laser emitter and the one or more transmitting optics are part of the TX in the TX/RX module, and the receiver frontend and the one or more receiving reflectors are part of the RX in the TX/RX module,
   wherein the laser emitter, the one or more transmitting optics, the one or more receiving reflectors, and the receiver frontend are assembled in a single package, and
   wherein the laser emitter, the one or more transmitting optics, and the receiver frontend are fixed to a substrate of the single package through permanent fixing, and the one or more receiving reflectors are fixed to the substrate through fluid dispensing different from the permanent fixing.

11. The optical sensing method of claim 10, wherein the one or more receiving reflectors define a light path within the integrated TX/RX module for directing the returned optical signal to one or more photosensors of the receiver frontend.

12. The optical sensing method of claim 11, comprising:
   focusing, by a receiving lens disposed in the light path, the returned optical signal on the one or more photosensors of the receiver frontend, wherein the receiving lens is assembled in the single package and aligned to focus the returned optical signal.

13. An integrated transmitter/receiver (TX/RX) module for an optical sensing system, the integrated TX/RX module comprising:
   a laser emitter;
   one or more transmitting optics;
   one or more receiving reflectors; and
   a receiver frontend,
   wherein:
      the laser emitter and the one or more transmitting optics are part of the TX in the TX/RX module, and the receiver frontend and the one or more receiving reflectors are part of the RX in the TX/RX module;

the laser emitter is configured to emit an optical signal toward the one or more transmitting optics;

the one or more transmitting optics are configured to form the optical signal received from the laser emitter into a predefined shape and direct the optical signal having the predefined shape to an environment surrounding the optical sensing system;

the one or more receiving reflectors are configured to direct a returned optical signal from the environment to the receiver frontend;

the receiver frontend is configured to convert the returned optical signal into an electrical signal;

the laser emitter, the one or more transmitting optics, the one or more receiving reflectors, and the receiver frontend are assembled in a single package; and the laser emitter, the one or more transmitting optics, and the receiver frontend are fixed to a substrate of the single package through permanent fixing, and the one or more receiving reflectors are fixed to the substrate through fluid dispensing different from the permanent fixing.

14. The integrated TX/RX module of claim 13, wherein the one or more receiving reflectors define a light path within the integrated TX/RX module for directing the returned optical signal to one or more photosensors of the receiver frontend.

15. The integrated TX/RX module of claim 14, further comprising a receiving lens disposed in the light path of the returned optical signal, the receiving lens being assembled in the single package and being aligned to focus the returned optical signal on the one or more photosensors of the receiver frontend.

16. The integrated TX/RX module of claim 13, wherein the receiver frontend comprises a photodetector and a read-out circuit connected to each other through wire bonding.

17. The integrated TX/RX module of claim 13, wherein the single package of the integrated TX/RX module is hermetically sealed.

18. The optical sensing system of claim 1, further comprising:
one or more driving integrated circuits (ICs) configured to drive the laser emitter; and
a set of pins disposed on the single package of the integrated TX/RX module for external communications with the controller,
wherein the one or more driving ICs are assembled in the single package and connected to the set of pins through one or more bonding wires.

19. The optical sensing system of claim 4, wherein the receiving lens is fixed to the substrate through the fluid dispensing.

* * * * *